United States Patent [19]

Klinedinst et al.

[11] Patent Number: 4,784,925

[45] Date of Patent: Nov. 15, 1988

[54] PRIMARY ELECTROCHEMICAL CELL CONTAINING MOLECULAR IODINE

[75] Inventors: Keith A. Klinedinst, Marlborough; William D. K. Clark, Wayland, both of Mass.

[73] Assignee: Whittaker Corporation, Los Angeles, Calif.

[21] Appl. No.: 809,747

[22] Filed: Nov. 8, 1985

Related U.S. Application Data

[63] Continuation-in-part of Ser. No. 538,464, Oct. 3, 1983.

[51] Int. Cl.$^4$ .............................................. H01M 4/00
[52] U.S. Cl. ................................. 429/29; 429/105; 429/196
[58] Field of Search ................. 429/101, 105, 196, 29, 429/72; 136/62 N

[56] References Cited

U.S. PATENT DOCUMENTS

| | | | |
|---|---|---|---|
| 3,891,457 | 6/1975 | Auborn | 136/6 LN |
| 3,897,264 | 7/1975 | Auborn | 136/6 LN |
| 4,037,025 | 7/1977 | Dey et al. | 429/29 |
| 4,218,523 | 8/1980 | Kalnoki-Kis | 429/101 |
| 4,327,159 | 4/1982 | Jones et al. | 429/101 |
| 4,352,866 | 10/1982 | Klinedinst et al. | 429/101 |
| 4,360,573 | 11/1982 | Rao et al. | 429/72 |

Primary Examiner—Peter A. Nelson
Attorney, Agent, or Firm—Donald E. Nist

[57] ABSTRACT

A primary electrochemical cell having an oxidizable active anode material, a cathode current collector, and an electrolytic solution. The electrolytic solution consists essentially of liquid cathode material, an electrolyte solute for imparting conductivity, and molecular iodine for catalyzing the electroreduction of the liquid cathode material. In a specific embodiment the anode material is lithium, the liquid cathode material is thionyl chloride, and the electrolyte solute is lithium tetrachloroaluminate.

14 Claims, 5 Drawing Sheets

PRIMARY ELECTROCHEMICAL CELL CONTAINING MOLECULAR IODINE

CROSS-REFERENCE TO RELATED APPLICATION

This application is a continuation-in-part of copending application Ser. No. 538,464 filed Oct. 2, 1983.

BACKGROUND OF THE INVENTION

This invention relates to electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of the cell is usually lithium or other highly electropositive metal. During discharge the solvent is electrochemically reduced on a cathode current collector.

One particular type of electrochemical cell of the foregoing class which contains a lithium anode employs a reducible liquid cathode of thionyl chloride. Typically the electrolyte solute dissolved in the thionyl chloride solvent is lithium tetrachloroaluminate. Lithium/thionyl chloride electrochemical cells have proven to have outstanding weight and volume energy density, long shelf life, and unusually high power density when compared with other cells previously available.

SUMMARY OF THE INVENTION

An electrochemical cell in accordance with the present invention which provides improved output voltage and output capacity comprises an oxidizable anode material, a cathode current collector, and an electrolytic solution in contact with the anode material and the cathode current collector. The electrolytic solution consists essentially of reducible liquid cathode material, an electrolyte solute dissolved in the reducible liquid cathode material for imparting conductivity to the electrolytic solution, and molecular iodine for catalyzing the electroreduction of the liquid cathode material.

Figure 1:
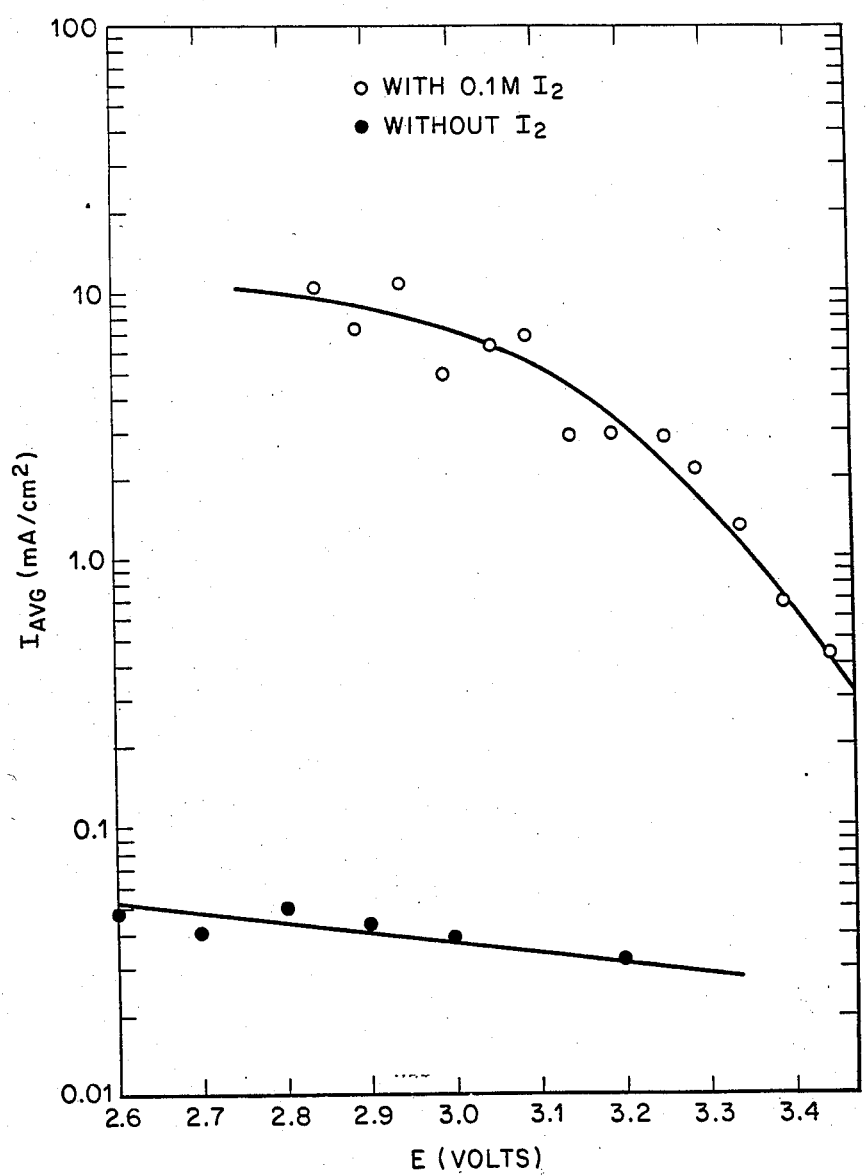
FIGS. 1 and 2 are graphs of curves of load voltage and capacity, respectively, versus average current density for test cells with and without a catalyst of molecular iodine.

For a better understanding of the present invention, together with other and further objects, advantages, and capabilities thereof, reference is made to the following discussion and appended claims in connection with the above-described drawings.

DETAILED DESCRIPTION OF THE INVENTION

Electrochemical cells in accordance with the present invention employ an anode, a cathode current collector, and an electrolytic solution which is in contact with the anode and cathode current collector. The anode and cathode current collector are separated from each other as by a thin porous layer of insulating material. The electrolytic solution comprises a fluid, reducible solvent cathode material with an electrolyte solute and a catalyst of molecular iodine dissolved therein.

The anode is an oxidizable material and is preferably lithium metal. Other oxidizable materials which may be employed in electrochemical cells of this type include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, fluid metallic halides, and mixtures thereof. Thionyl chloride ($SOCl_2$) is a preferred liquid cathode material.

The electrolyte solute of the electrolytic solution may be $LiAlCl_4$, $LiAlBr_4$, $LiBCl_4$, $LiBF_4$, $LiAsF_6$, $LiSbCl_6$, $Li_2SnCl_6$, or $Li_2TiCl_6$. The electrolyte solute may also be a Lewis acid such as $AlCl_3$, $SnCl_4$, $TiCl_4$, $SbCl_5$, or $BCl_3$, or a combination of a Lewis acid with a Lewis base such as $LiCl$, $LiBr$, or $LiF$. The molarity of the solute in the solution is usually from about 0.5 to about 2.5 M. In lithium/thionyl chloride cells the molarity of the solute is preferably from about 1.5 to about 2.0 M.

In accordance with the present invention, the electrolytic solution also includes an electroreducing catalyst of molecular iodine ($I_2$). The molecular iodine may be introduced into the solution as $I_2$ or as an iodide which forms $I_2$ without providing any constituents having a material effect on the cell or its operation. The metal constituent of the iodide may form a salt with other constituents of the electrolytic solution which is either insoluble or, if soluble, is inert.

The following examples are for the purpose of further illustrating and explaining the present invention, and are not to be taken as limiting the scope thereof.

EXAMPLE I

Test electrochemical cells were constructed with polished vitreous carbon working electrodes and with lithium counter and reference electrodes. The cells contained an electrolytic solution of 1.0 M lithium tetrachloroaluminate ($LiAlCl_4$) in thionyl chloride ($SOCl_2$). (A quantity of $POCl_3$ was added as a cosolvent. This cosolvent does not interfere with the operation of the cell since it is reduced below 2.0 V upon the vitreous carbon working electrode.) Cells of this type were discharged at ambient temperature with constant 3.2 mA/$cm^2$ current densities both with and without the addition of 0.1 M of $I_2$ to the oxyhalide electrolyte. The resulting discharge characteristics are listed in Table I. A 610 mV increase in average load voltage and a 17-fold increase in discharge capacity was achieved by the addition of 0.1 M $I_2$ to the $SOCl_2$ electrolyte.

TABLE I

Li/SOCl$_2$ Discharge Characteristics at 3.2 mA/cm$^2$
vs
Catalyst Concentration

| I$_2$(Moles) | E$_{avg}$(Volts) | Capacity (mC/cm$^2$) |
|---|---|---|
| 0.00 | 2.70 | 45 |
| 0.10 | 3.31 | 832 |

EXAMPLE II

Cells identical to those described in Example I were discharged at constant 6.4 mA/cm$^2$ rates to yield the discharge characteristics listed in Table II. Addition of the electrocatalyst to the SOCl$_2$ electrolyte resulted in a 520 mV increase in average load voltage and a 13-fold increase in discharge capacity.

TABLE II

Li/SOCl$_2$ Discharge Characteristics at 6.4 mA/cm$^2$
vs
Catalyst Concentration

| I$_2$ (Moles) | E$_{avg}$(Volts) | Capacity (mC/cm$^2$) |
|---|---|---|
| 0.00 | 2.68 | 25 |
| 0.10 | 3.20 | 343 |

EXAMPLE III

Cells identical to those described in Example I were discharged at constant 19.2 mA/cm$^2$ rates. The resulting discharge characteristics are listed in Table III. A 430 mV increase in average load voltage and a 10-fold increase in discharge capacity resulted from the addition of the I$_2$ electrocatalyst.

TABLE III

Li/SOCl$_2$ Discharge Characteristics at 19.2 mA/cm$^2$
vs
Catalyst Concentration

| I$_2$(Moles) | E$_{avg}$(Volts) | Capacity (mC/cm$^2$) |
|---|---|---|
| 0.00 | 2.52 | 15 |
| 0.10 | 2.95 | 164 |

EXAMPLE IV

Cells identical to those in Example I were discharged at constant 32.0 mA/cm$^2$ rates. The resulting discharge characteristics are listed in Table IV. Addition of the I$_2$ electrocatalyst to the SOCl$_2$ electrolyte resulted in a 370 mV increase in average load voltage and an 8½-fold increase in discharge capacity.

TABLE IV

Li/SOCl$_2$ Discharge Characteristics at 32.0 mA/cm$^2$
vs
Catalyst Concentration

| I$_2$ (Moles) | E$_{avg}$ (Volts) | Capacity(mC/cm$^2$) |
|---|---|---|
| 0.00 | 2.41 | 9.4 |
| 0.10 | 2.78 | 89.6 |

EXAMPLE V

Figure 2:
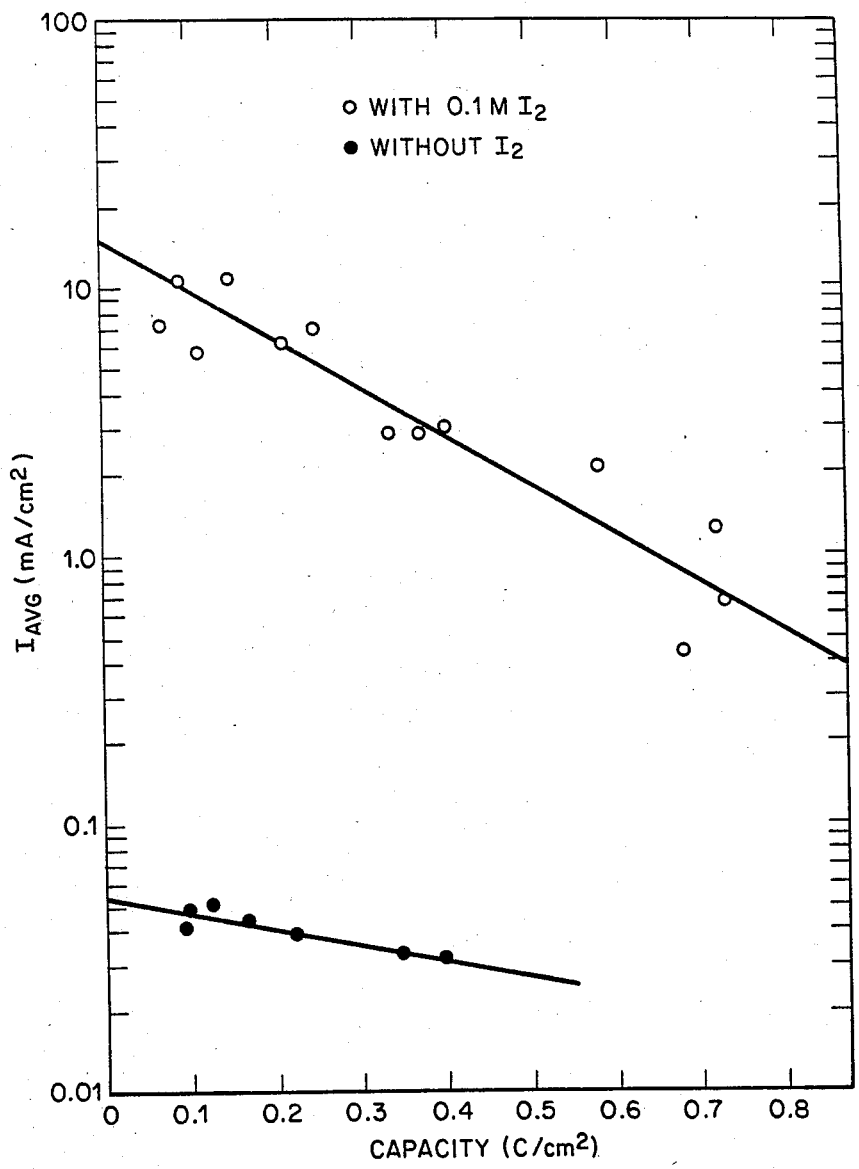

Cells identical to those in Example I were discharged potentiostatically with cathode potentials ranging between 2.6 V and 3.5 V. The resulting average current densities and discharge capacities obtained with and without the I$_2$ electrocatalyst (at a 0.1 M concentration) are listed in Tables V-A and V-B, respectively. The polarization (load voltage) and capacity data are plotted semilogarithmically versus average current density in FIGS. 1 and 2, respectively. As shown, the I$_2$ electrocatalyst at a 0.1 M concentration enabled load voltages and capacities to be achieved at current densities roughly two orders of magnitude higher than can be sustained in the absence of the catalyst.

TABLE V-A

Potentiostatic Li/SOCl$_2$ Discharge Characteristics
with 0.1M I$_2$ Electrocatalyst

| E(Volts) | I$_{avg}$(mA/cm$^2$) | Capacity (mC/cm$^2$) |
|---|---|---|
| 2.84 | 10.26 | 93.6 |
| 2.89 | 7.12 | 72.0 |
| 2.94 | 10.72 | 151 |
| 2.99 | 4.67 | 115 |
| 3.05 | 6.08 | 212 |
| 3.09 | 6.68 | 252 |
| 3.14 | 2.81 | 338 |
| 3.19 | 2.91 | 407 |
| 3.24 | 2.81 | 378 |
| 3.29 | 2.11 | 569 |
| 3.34 | 1.26 | 720 |
| 3.39 | 0.66 | 734 |
| 3.44 | 0.43 | 684 |

TABLE V-B

Potentiostatic Li/SOCl$_2$ Discharge Characteristics
Without I$_2$ Electrocatalyst

| E(Volts) | I$_{avg}$(mA/cm$^2$) | Capacity(mC/cm$^2$) |
|---|---|---|
| 2.60 | 0.048 | 97.2 |
| 2.70 | 0.041 | 90.0 |
| 2.80 | 0.050 | 126 |
| 2.90 | 0.043 | 169 |
| 3.00 | 0.038 | 234 |
| 3.10 | 0.032 | 346 |
| 3.20 | 0.031 | 396 |

EXAMPLE VI

Single cathodic potentiodynamic scans were performed from open circuit with cells identical to those in Example I. The scan rate was 50 mV/sec, and the SOCl$_2$ electrolyte contained 0 M, 0.001 M, 0.01 M, and 0.10 M concentrations of the iodine electrocatalyst. The peak potentials and total charge passed (to 2.0 V) are listed versus I$_2$ concentration in Table VI. As shown, even 0.001 M I$_2$ was sufficient to increase the peak potential by 40 mV and increase the total charge by about 20%. With 0.1 M I$_2$, a 130 mV increase in peak potential was achieved with a 5-fold increase in total charge.

TABLE VI

Potentiodynamic Scan Peak Potentials and Total Charge
vs
The Concentration of I$_2$ in the SOCl$_2$ Electrolyte

| I$_2$(Moles) | E$_{peak}$(Volts) | Total Charge (mC/cm$^2$) |
|---|---|---|
| 0 | 2.69 | 52.6 |
| 0.001 | 2.73 | 62.3 |
| 0.01 | 2.79 | 87.7 |
| 0.1 | 2.82 | 308 |

EXAMPLE VII

Li/SOCl$_2$ cells were constructed with PTFE-bonded Shawinigan acetylene black cathodes (1 cm$^2$×1 mm) and with 1.5 M LiAlCl$_4$ in SOCl$_2$ as electrolyte. To the electrolyte was added molecular iodine to catalyze the electroreduction of SOCl$_2$, the iodine concentration ranging between 0.0 M and 0.1 M. These cells were discharged at ambient temperature through 100 ohm loads to yield the average load voltages, current densities, and discharge capacities listed in Table VII. As shown, the overvoltage for $SOCl_2$ reduction was reduced by 110 mV and the discharge capacity was increased by 135% by the addition of 0.05 M $I_2$ to the $SOCl_2$ electrolyte.

TABLE VII

Li/SOCl$_2$ Cell Constant Load Discharge Characteristics at Ambient Temperature vs I$_2$ Catalyst Concentration

| I$_2$ (Moles) | E$_{avg}$(Volts) | I$_{avg}$(mA/cm$^2$) | Capacity (mAhr/cm$^2$) |
|---|---|---|---|
| 0.00 | 3.06 | 30.6 | 24.0 |
| 0.025 | 3.10 | 31.0 | 51.1 |
| 0.05 | 3.17 | 31.7 | 56.1 |
| 0.10 | 3.18 | 31.8 | 57.5 |
| 0.20 | 3.21 | 32.1 | 48.5 |

Figure 3:
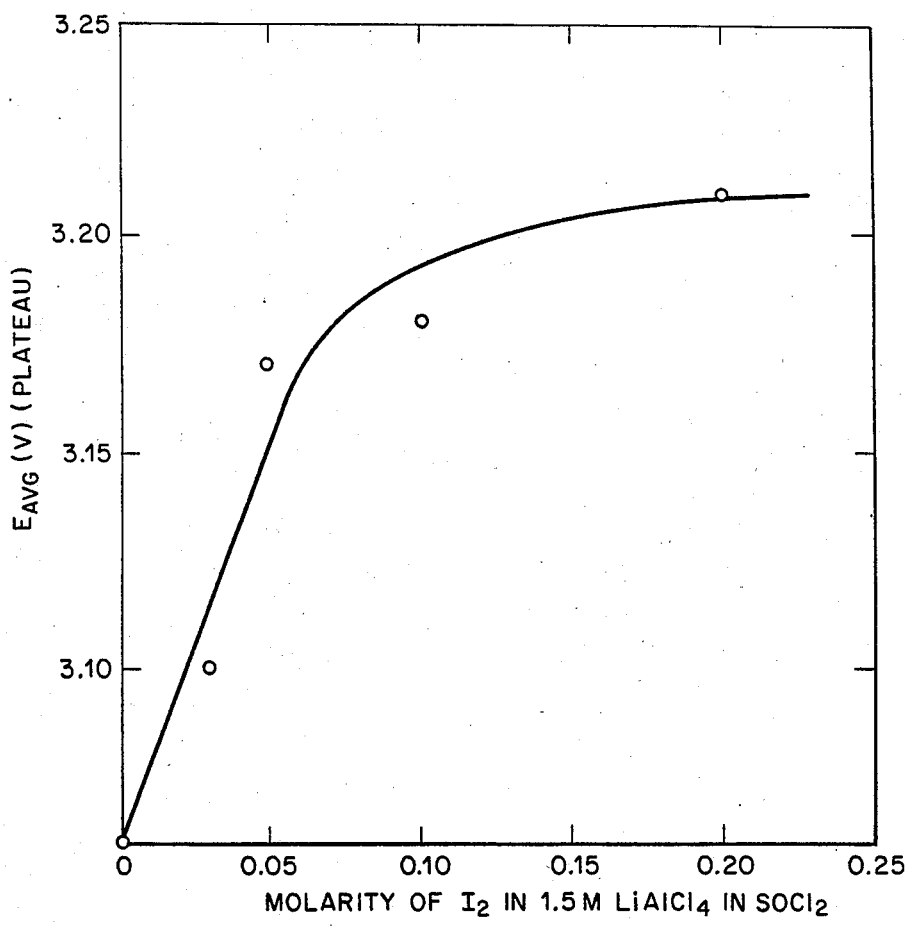
FIG. 3 is a graph illustrating the relationships between the output voltage of electrochemical cells in accordance with the invention and the molarity of iodine in the solution.
Figure 4:
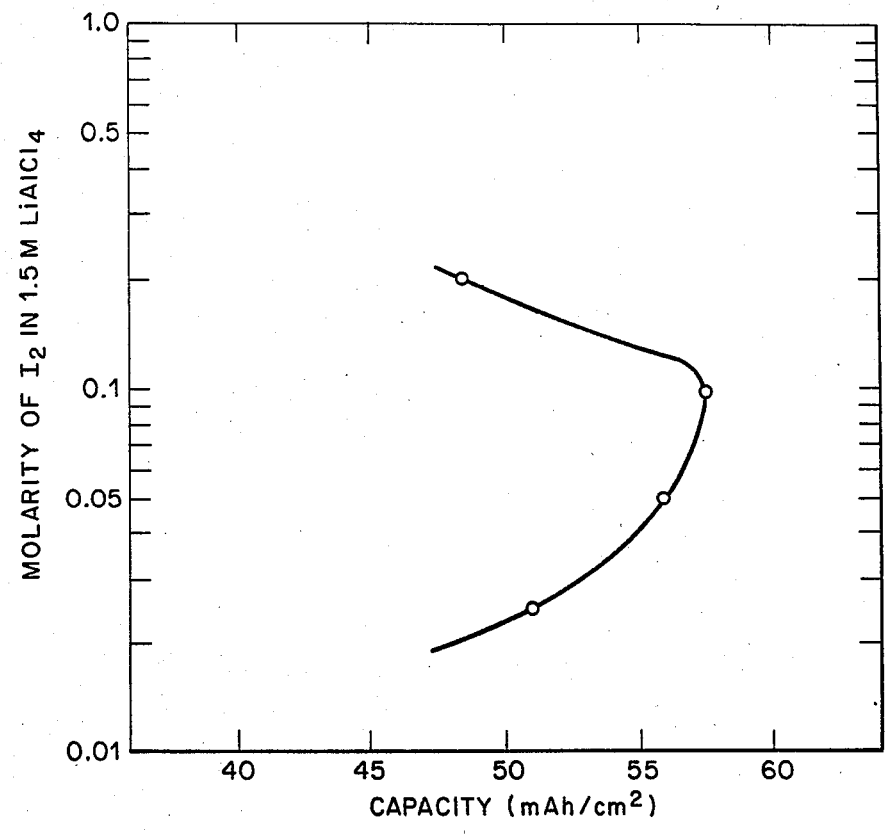
FIG. 4 is a graph illustrating the relationships between the capacity of electrochemical cells in accordance with the invention and the molarity of iodine in the solution.

FIG. 3 is a graph of the data in Table VII of cell output voltage with respect to the molar concentration of the iodine catalyst in the electrolytic solution. FIG. 4 is a graph of the data in Table VII illustrating the capacity of the cells with respect to the molar concentration of the iodine on a logarithmic scale.

EXAMPLE VIII

Figure 5:
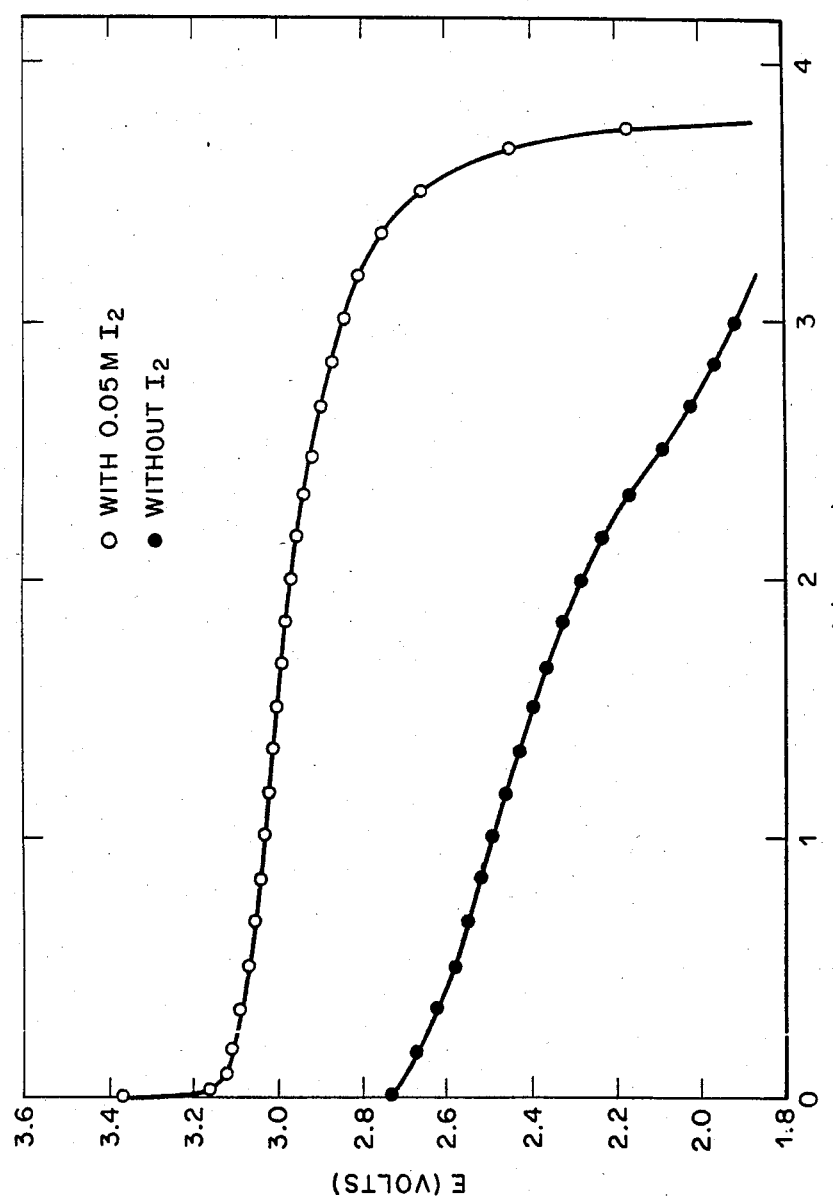
FIG. 5 is a graph of discharge characteristics of electrochemical cells with and without a catalyst of molecular iodine.

Li/SOCl$_2$ cells identical to those described in Example VII were discharged through 200 ohm loads at $-20°$ C. The discharge characteristics obtained both with and without the addition of 0.05 M I$_2$ to the SOCl$_2$ electrolyte are listed in Table VIII and typical discharge curves are compared in FIG. 5. The I$_2$ catalyst produced a 560 mV increase in average load voltage and a 70% increase in discharge capacity.

TABLE VIII

Li/SOCl$_2$ Cell Constant Load Discharge Characteristics At $-20°$ C. vs I$_2$ Catalyst Concentration

| I$_2$(Moles) | E$_{avg}$(Volts) | I$_{avg}$(mA/cm$^2$) | Capacity (mAhr/cm$^2$) |
|---|---|---|---|
| 0.00 | 2.40 | 12.0 | 33.0 |
| 0.05 | 2.96 | 14.8 | 55.7 |

The molecular iodine catalyst is effective for the electroreduction of thionyl chloride at concentrations between 0.001 M and 0.5 M. However, the preferred concentrations range between 0.01 M and 0.2 M.

The mechanism by which small quantities of molecular iodine catalyze the electroreduction of thionyl chloride has not been determined with certainty. It is known, however, that LiI is readily converted to LiCl by reaction with $SOCl_2$.

$$4I^- + 2SOCl_2 \rightarrow S + SO_2 + 2I_2 + 4Cl^-$$

This solvolysis reaction occurs via the formation of the relatively unstable thionyl iodide, $SOI_2^4$.

$$4I^- + 2SOCl_2 \rightleftharpoons 2SOI_2 + 4Cl^-$$

$$2SOI_2 \rightleftharpoons S + SO_2 + 2I_2$$

Assuming that, on a carbon electrode, the electroreduction of molecular iodine occurs more rapidly and at higher potentials than the electroreduction of thionyl chloride, these reactions provide a mechanism by which molecular iodine (dissolved in the thionyl chloride electrolyte) might be chemically regenerated. The following reactions would then summarize the mechanism by which molecular iodine catalyzes the reduction of thionyl chloride on a carbon electrode. The net result is that thionyl chloride is reduced at potentials governed by the $I_2/I^-$ redox couple.

Electrochemical reaction $2I_2 \text{(adsorbed)} + 4e^- \rightarrow 4I^-$

Chemical Reaction
$4I^- + 2SOCl_2 \rightarrow S + SO_2 + 2I_2 + 4Cl^-$

Overall Reaction $2SOCl_2 + 4e^- \rightarrow S + SO_2 + 4Cl^-$

While there have been shown and described what are considered preferred embodiments of the present invention, it will be obvious to those skilled in the art that various changes and modifications may be made therein without departing from the invention as defined by the appended claims.

What is claimed is:

1. An electrochemical cell comprising
   an oxidizable anode material;
   a cathode current collector;
   an electrolytic solution, in contact with the anode material and the cathode current collector;
   said electrolytic solution consisting essentially of reducible liquid cathode material, an electrolyte solute dissolved in the reducible liquid cathode material for imparting conductivity to the electrolytic solution, and molecular iodine for catalyzing the electroreduction of the liquid cathode material.

2. An electrochemical cell in accordance with claim 1 wherein
   the electrolyte solute is LiAlCl$_4$, LiAlBr$_4$, LiBCl$_4$, LiBF$_4$, LiAsF$_6$, LiSbCl$_6$, Li$_2$SnCl$_6$, Li$_2$TiCl$_6$, AlCl$_3$, SnCl$_4$, TiCl$_4$, SbCl$_5$, BCl$_3$, or a combination of AlCl$_3$, SnCl$_4$, TiCl$_4$, SbCl$_5$, or BCl$_3$ with LiCl, LiBr, or LiF.

3. An electrochemical cell in accordance with claim 2 wherein
   the reducible liquid cathode material is selected from the group consisting of fluid oxyhalides, fluid non-metallic oxides, fluid non-metallic halides, fluid metallic halides, and mixtures thereof.

4. An electrochemical cell in accordance with claim 3 wherein
   the oxidizable anode material is an alkali metal or an alkaline earth metal.

5. An electrochemical cell in accordance with claim 4 wherein
   the concentration of molecular iodine in the electrolytic solution is between about 0.001 M and 0.5 M.

6. An electrochemical cell in accordance with claim 5 wherein
   the oxidizable anode material is lithium.

7. An electrochemical cell in accordance with claim 6 wherein
   the electrolyte solute is lithium tetrachloroaluminate.

8. An electrochemical cell in accordance with claim 7 wherein
   the reducible liquid cathode material is thionyl chloride.

9. An electrochemical cell in accordance with claim 1 wherein
   the concentration of molecular iodine in the electrolytic solution is between about 0.01 M and 0.2 M.

10. An electrochemical cell in accordance with claim 9 wherein
    the electrolyte solute is LiAlCl$_4$, LiAlBr$_4$, LiBCl$_4$, LiBF$_4$, LiAsF$_6$, LiSbCl$_6$, Li$_2$SnCl$_6$, Li$_2$TiCl$_6$, AlCl, SnCl$_4$, TiCl$_4$, SbCl$_5$, BCl$_3$, or a combination of $AlCl_3$, $SnCl_4$, $TiCl_4$, $SbCl_5$, or $BCl_3$ with LiCl, LiBr, or LiF.

11. An electrochemical cell in accordance with claim 10 wherein
   the oxidizable anode material is an alkali metal or an alkaline earth metal; and
   the reducible liquid cathode material is selected from the group consisting of fluid oxyhalides, fluid non-metallic oxides, fluid non-metallic halides, fluid metallic halides, and mixtures thereof.

12. An electrochemical cell in accordance with claim 11 wherein
   the oxidizable anode material is lithium.

13. An electrochemical cell in accordance with claim 12 wherein
   the electrolyte solute is lithium tetrachloroaluminate.

14. An electrochemical cell in accordance with claim 13 wherein
   the reducible liquid cathode material is thionyl chloride.

* * * * *